United States Patent [19]

Matsuura et al.

[11] Patent Number: 4,697,217
[45] Date of Patent: Sep. 29, 1987

[54] MAGNETIC HEAD HAVING A MAIN CORE OF SHEET AMORPHOUS MAGNETIC MATERIAL

[75] Inventors: Kotaro Matsuura, Kyoto; Kenji Oyamada, Yahata, both of Japan

[73] Assignee: Sanyo Electric Co., Ltd., Osaka, Japan

[21] Appl. No.: 541,809

[22] Filed: Oct. 13, 1983

[30] Foreign Application Priority Data

Oct. 13, 1982 [JP] Japan ................................ 57-180476
Nov. 12, 1982 [JP] Japan ................................ 57-199266

[51] Int. Cl.⁴ .......................................... G11B 5/127
[52] U.S. Cl. .................................... 360/125; 360/120
[58] Field of Search ............... 360/119, 120, 122, 124, 360/126, 125, 127; 420/440, 435; 29/603

[56] References Cited

U.S. PATENT DOCUMENTS

| | | | |
|---|---|---|---|
| 4,079,430 | 3/1978 | Fujishima et al. | 360/126 |
| 4,107,751 | 8/1978 | Shimoda | 360/122 |
| 4,115,827 | 9/1978 | Gooch | 360/125 |
| 4,190,438 | 2/1980 | Aso et al. | 75/123 R X |
| 4,298,899 | 11/1981 | Argumedo et al. | 360/122 |
| 4,416,709 | 11/1983 | Ohya et al. | 420/440 X |
| 4,419,415 | 12/1983 | Liefkens et al. | 360/126 X |
| 4,441,132 | 4/1984 | Morita et al. | 360/126 |
| 4,475,137 | 10/1984 | Yasuda et al. | 360/119 |
| 4,535,376 | 8/1985 | Nomura et al. | 360/126 |
| 4,578,728 | 3/1986 | Sakakima et al. | 360/125 |

FOREIGN PATENT DOCUMENTS

| | | | |
|---|---|---|---|
| 0061069 | 9/1982 | European Pat. Off. | 360/127 |
| 0074322 | 6/1977 | Japan | 29/603 |
| 0033111 | 3/1978 | Japan | 360/120 |
| 56-159818 | 12/1981 | Japan | |
| 0105816 | 7/1982 | Japan | 360/119 |
| 0138027 | 8/1982 | Japan | 360/120 |
| 0210417 | 12/1982 | Japan | 360/125 |
| 58-32218 | 2/1983 | Japan | |
| 0083319 | 5/1983 | Japan | 29/603 |
| 58-130421 | 8/1983 | Japan | |
| 58-133620 | 8/1983 | Japan | |

Primary Examiner—Robert S. Tupper
Assistant Examiner—Andrew L. Sniezek
Attorney, Agent, or Firm—Armstrong, Nikaido Marmelstein & Kubovcik

[57] ABSTRACT

This disclosure is directed to an amorphous magnetic head which includes a main core having core halves each formed from non-laminated thin sheets of amorphous magnetic material, a non-magnetic spacer, with the core halves being abutted against each other through the non-magnetic spacer disposed in a front gap which is provided between the core halves and whose lower edge is defined by a coil winding opening formed in the core halves, and a set of reinforcing members applied onto opposite sides of the main core to hold the core halves between them. Resinous material is infiltered between the respective reinforcing members and the core halves for integration of the respective elements into one unit. The disclosure also relates to a method of manufacturing such an amorphous magnetic head on a large scale in an efficient manner.

3 Claims, 35 Drawing Figures

MAGNETIC HEAD HAVING A MAIN CORE OF SHEET AMORPHOUS MAGNETIC MATERIAL

BACKGROUND OF THE INVENTION

The present invention generally relates to a head for recording a signal containing a high frequency component as in a television signal, onto a recording medium having a high coercive force or for reproducing such a signal therefrom, and more particularly, to an amorphous magnetic head in which a main core is composed of an amorphous magnetic material and also, to a manufacturing method of such an amorphous magnetic head in an efficient manner.

Generally, in a magnetic head for a video tape recorder (VTR), ferrite single crystal material is employed for a main core, because said material is superior in abrasion resistance, with favorable soft magnetic characteristics. Incidentally, owing to the recent trend toward compact size of video tape recorders, there has been a tendency that a material such as a metal tape and the like having a high coercive force and capable of achieving recording at a higher density is employed also for a magnetic tape, for example, as in the so-called 8 mm movie camera type video tape recorders. Different from the conventional $\gamma$-$Fe_2O_3$ tape, such metal tapes have a high coercive force, and therefore, if ferrite materials having saturation flux densities in the range of 4000 to 5000 gauss at most are adopted, the magnetic head is subjected to magnetic saturation, and can not effect magnetization by overcoming the coercive force of the metal tape. Accordingly, at present, investigations are made into the magnetic heads which employ Fe-Al-Si alloy (sendust) materials (saturation flux density $Bs \approx 8000$ gauss), amorphous material (saturation flux density $Bs \approx 10,000$ gauss), etc. having higher saturation flux densities as main cores, of which the sendust heads have already been supplied into the market as audio heads corresponding to metal tapes. However, the sendust heads as referred to above have various disadvantages for the heads of video tape recorders to be used in a higher frequency range (e.g. 5 MHZ or thereabout) in that machining thereof is difficult, while due to a low electrical resistance as compared with the ferrite material, the sendust heads have a large eddy current loss at high frequency range, with a sharp reduction of the effective permeability, and thus, the sendust heads have not been supplied as yet into the market for the heads of video tape recorders currently available.

On the other hand, with respect to the amorphous magnetic head, although attention has recently been directed to the amorphous material itself (during the past five years at most) as a future magnetic material for development both in Japan and abroad, the amorphous magnetic heads have not yet been put into practical application at the current stage.

As is well known, the amorphous material is obtained by a manufacturing method referred to as a liquid melt rapid cooling method, in which an amorphous material having an alloy composition not conceivable by the conventional knowledge of metallurgy may be produced in terms of principle. On the contrary, there is a limitation to the configurations of the material to be produced by the above manufacturing method. More specifically, since it is required to rapidly cool the molten metal at cooling speeds of 100,000° to 1,000,000° C./sec., the resultant amorphous material is obtainable only in the form of a ribbon-like sheet of 10 to 100 microns in thickness or in form of a powder.

Accordingly, in the amorphous magnetic material, it is not possible to employ, as it is, the manufacturing method conventionally adopted for the ferrite material, i.e., the processing technique such as cutting, polishing, welding, etc. from a bulk material. However, in the case where the conventional manufacturing method as described above is to be followed somehow, it may be considered to employ a starting material prepared by laminating a large number of ribbon-like sheets one upon another (i.e., forming such ribbon-like sheets into a shape similar to the bulk material), thereby to constitute a magnetic head with a track width less than a thickness of the ribbon-like sheet, but since precise control of a thickness of a bonding material layer between the ribbon-like sheets can not be readily effected, it is extremely difficult to arrange the confronting core halves to face each other precisely.

Moreover, as a problem inherent in the amorphous material, there is the problem related to crystallization temperature Tx. Generally, amorphous materials prepared by the rapid cooling method have transition points of crystalline structure referred to as vitrification temperature Tg and cyrstallization temperature Tx. In connection with the above, the vitrification temperature is a temperature at which the amorphous material begins to be softened in the similar manner as in the common soda-lime glass, silica glass, etc., while the crystallization temperature is a temperature at which the amorphous structure is transferred to the crystalline structure. It is to be noted here that, different from glass in general, the amorphous material is not provided with reversibility during passing of the above transition points. In other words, once the amorphous structure has been turned into the crystalline structure, it will never be returned into the original amorphous state. Accordingly, for manufacturing magnetic heads with the use of such amorphous material as described above, it is not possible to apply thermal or mechanical energy exceeding the crystallization temperature Tx, while processing techniques such as glass welding, brazing, etc. for the conventional ferrite material, sendust material, etc. can not be applied, thus making it necessary to develop new processing and manufacturing techniques.

SUMMARY OF THE INVENTION

Accordingly, an essential object of the present invention is to provide a magnetic head having a main core made of a thin sheet of an amorphous magnetic material, i.e., an amorphous magnetic head, which is capable of efficiently recording high frequency signals such as video signals, etc. on a high coercive tape such as a metal tape, with a simultaneous prolongation of life.

Another important object of the present invention is to provide an amorphous magnetic head of the above described type, which is stable in functioning at high reliability, and can be readily manufactured at low cost.

A further object of the present invention is to provide a method of manufacturing an amorphous magnetic head of the above described type in an efficient manner on a large scale.

In accomplishing these and other objects, according to one preferred embodiment of the present invention, there is provided an amorphous magnetic head which includes a main core having core halves each formed from non-laminated thin sheets of amorphous magnetic material, a non-magnetic spacer, said core halves being abutted against each other through the non-magnetic spacer disposed in a head gap which is provided between said core halves and whose lower edge is defined by a coil winding opening formed in the core halves, and a set of reinforcing members applies onto opposite sides of the main core to hold the core halves therebetween, with resinous material being filled between the respective reinforcing members and the core halves for integration of the respective elements into one unit.

The amorphous magnetic head of the present invention as described above may be produced by a manufacturing method which includes the steps of constituting a set of core halves each having a coil winding opening which defines a lower edge of a front gap at least in one of abutted faces thereof through processing of thin sheets of amorphous magnetic material without lamination thereof, arranging the core halves to be abutted against each other through a noin-magnetic spacer disposed at the head gap between said core halves, holding the core halves thus abutted against each other between a set of reinforcing members, and filling resinous material through penetration between the core halves and the reinforcing members under a state where both of said core halves are depressed from all directions, i.e., both vertically and laterally, for subsequent heating and curing of the resinous material, thereby to integrate the respective elements into one unit.

By the arrangement and steps according to the present invention as described above, an amorphous magnetic head highly efficient in use has been advantageously presented.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Before the description of the present invention proceeds, it is to be noted that like parts are designated by like reference numerals throughout the accompanying drawings.

Figure 1:
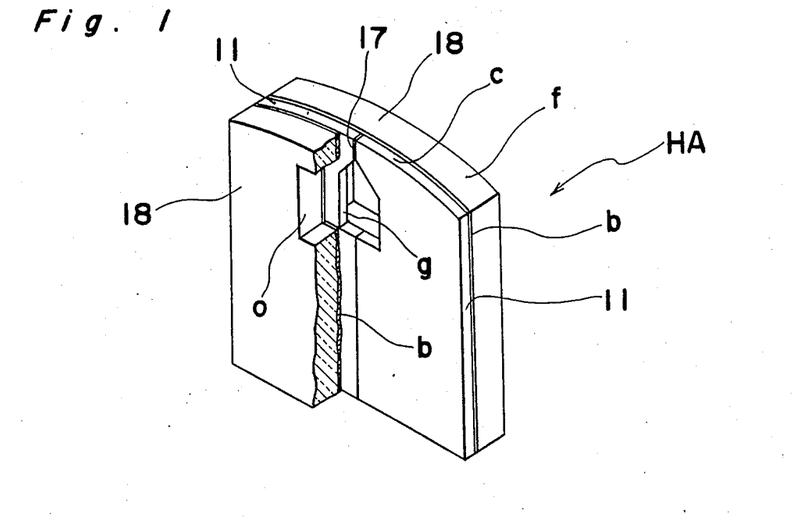
FIG. 1 is a perspective view, partly broken away, of an amorphous magnetic head according to one preferred embodiment of the present invention.
Figures 2A, 2B:
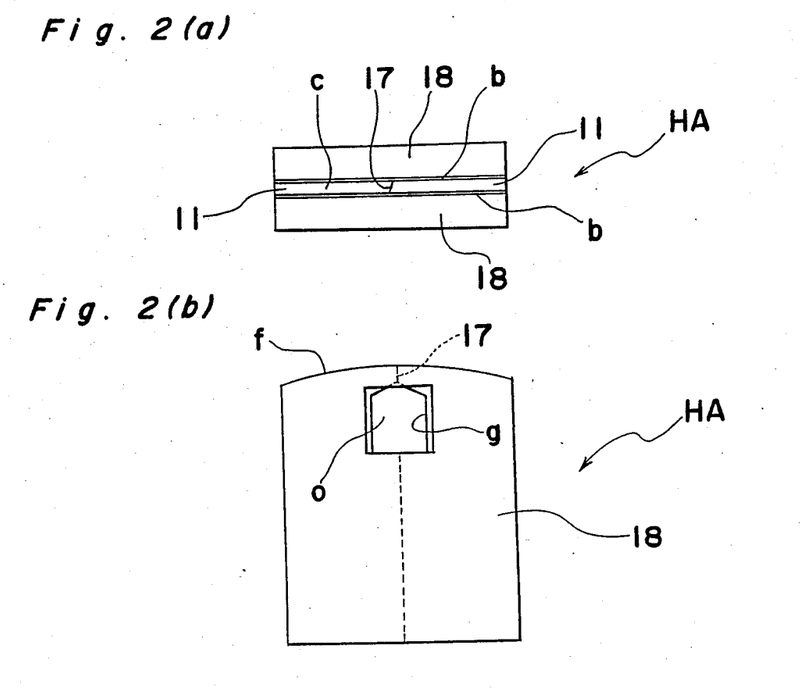
FIGS. 2(a) and 2(b) are a top plan view and a front elevational view of the magnetic head of FIG. 1.

Referring now to the drawings, there is shown, in FIGS. 1 to 2(b), an amorphous magnetic head HA according to one preferred embodiment of the present invention. The magnetic head HA generally comprises a main core c which includes core halves 11 abutted against each other and each formed by shaping a non-laminated thin plate or sheet (24 microns in thickness) of an amorphous magnetic material, a pair of reinforcing members 18 for holding the main core c therebetween, and layers b of a bonding material (less than 2 microns in thickness) each applied between the main core c and the reinforcing member 18 so as to be cured or hardened. Each of the core halves 11 is formed with a notch or groove g as a coil winding opening between the abutted faces thereof, while a spacer 17 of a non-magnetic material for forming a head gap is provided at the upper portion of the groove g. Each of the reinforcing members 18 made, for example, of glass material is formed with a through-hole o in a position corresponding to the groove g or coil winding opening of the main core c so as to make it possible to effect the so-called balance winding of the coils (not particularly shown) therethrough.

The magnetic head HA is ground for providing a predetermined radius of curvature on its contact face f confronting a magnetic tape (not shown) so as to achieve a proper matching with respect to the magnetic tape during running of said magnetic tape.

Meanwhile, since the magnetic head HA is extremely small in size with dimensions of about 3 mm square and several hundred microns in thickness, the side faces of the reinforcing members 18 are connected to a head base (not particularly shown), with the contact face f of the head HA being projected from said head base for easiness in handling.

The magnetic head HA according to the present invention which is formed by arranging the core halves 11 made of non-laminated thin sheets of the amorphous magnetic material to be abutted against each other, and applying the reinforcing members 18 of glass material to opposite sides of the core halves 11, with infiltration of resin or bonding agent b therebetween for the formation of the entire structure into one unit, can be manufactured at a high yield.

Figure 3:
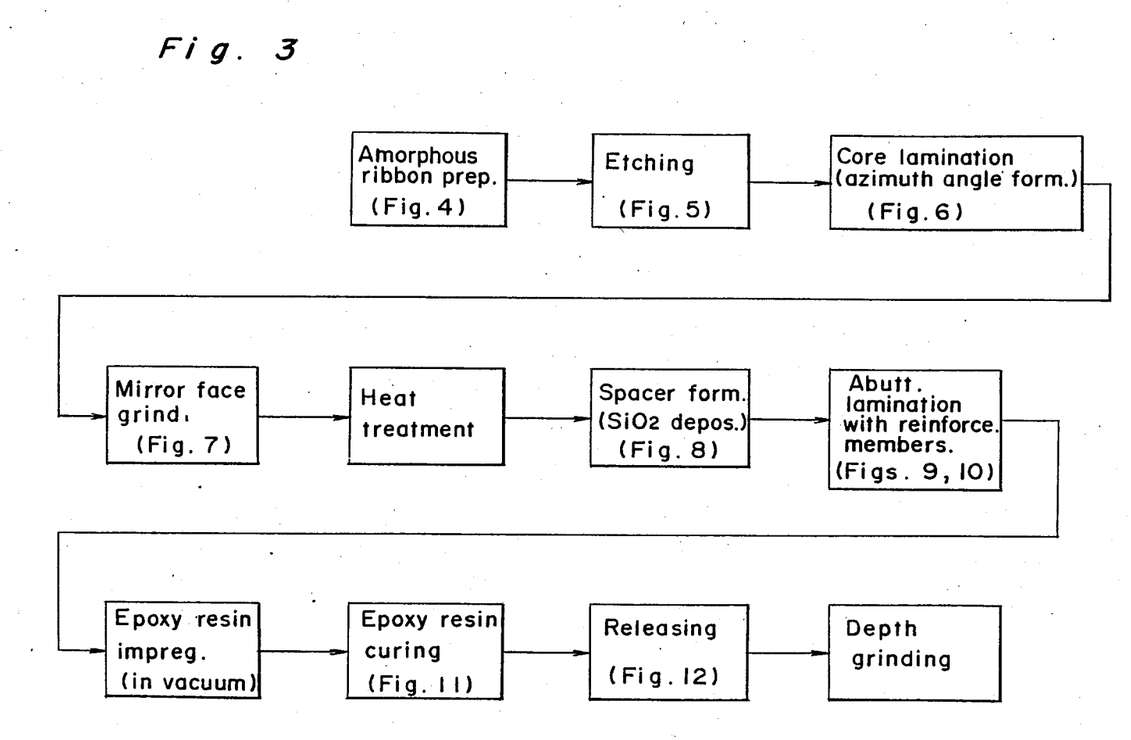
FIG. 3 is a flow-chart for explaining a manufacturing process of the magnetic head of FIG. 1.
Figure 4:
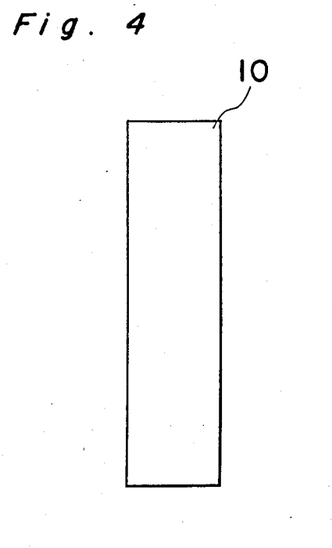
FIG. 4 is a fragmentary top plan view of an amorphous ribbon to be employed in the manufacture of the magnetic head of FIG. 1.
Figure 5:
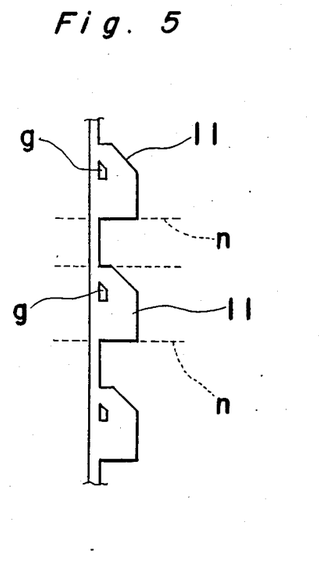
FIG. 5 is the fragmentary top plan view of the amorphous ribbon of FIG. 4 after etching.

Referring further to a flow-chart of FIG. 3 and also, to FIGS. 4 to 11 illustrating states of processings at respective steps, the outline of the method of manufacturing the magnetic head according to the present invention will be explained hereinbelow.

Figure 6A:
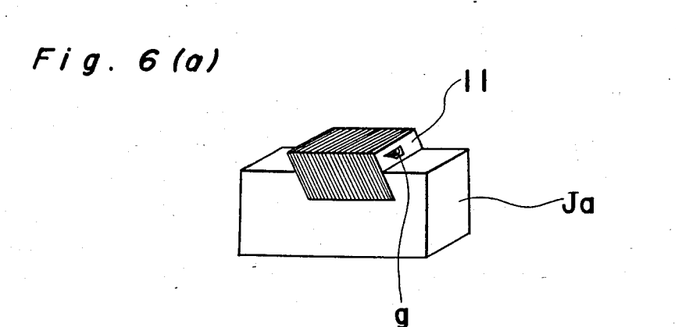
FIGS. 6(a) and 6(b) are perspective views showing states in which core chips prepared from the amorphous ribbon of FIG. 5 are accommodated in jigs.
Figure 6B:
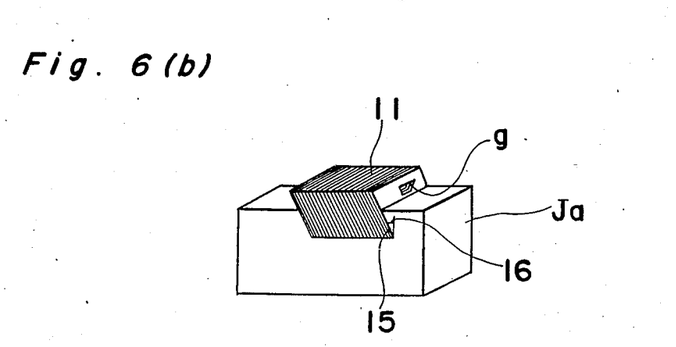
Figures 7A, 7B:
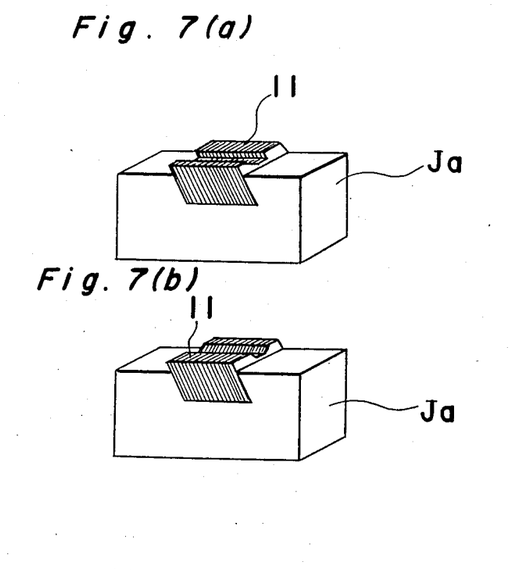
FIGS. 7(a) and 7(b) are views similar to FIGS. 6(a) and 6(b), which particularly show the states after grinding.

In the first place, a thin sheet or ribbon 10 of the amorphous material approximately 24 microns or so in thickness is prepared by the liquid melt rapid cooling method as described earlier (FIG. 4), and a series of core halves 11 of a required shape are formed in the above ribbon 10 by a chemical etching (FIG. 5), with a through-opening for the groove g being formed in each of the core halves 11 for winding the coil therethrough. The series of core halves 11 thus prepared are cut off along dotted lines n to obtain a large number of core halves or core chips 11. As shown in FIGS. 6(a) and 6(b), the core chips 11 are accommodated in a jig Ja so that the through-openings are arranged in a forward position at one side, and in a rearward position at the other side, and are first subjected to rough grinding so as to remove sagging and the like by the etching for setting the core halves 11 into the predetermined dimensions. Subsequently, the head gap forming face of the magnetic head is ground through employment of very fine grinding grains and a grinding machine. FIGS. 7(a) and 7(b) show the states upon termination of the above grinding.

In the above case, an angle 16 for accommodating the core halves 11 with respect to a wall surface 15 of the jig Ja (FIG. 6(b)) is arranged to coincide with an azimuth angle of the magnetic head.

The core chips 11 ground as described above are detached from the jig Ja for a heat treatment, which is intended to remove stresses due to the rapid cooling and mechanical processing during manufacture of the amorphous material, and also, to eliminate a grinding strain imparted during the above grinding process. Generally, by applying such heat treatment, the permeability of cores may be improved, because a weak magnetic anisotropy actually remains in the lengthwise and widthwise directions of the ribbon of amorphous material due to temperature gradient and mechanical stress during the rapid cooling of the ribbon, although the amorphous material having no crystalline structure should normally be free from crystalline anisotropy in terms of principle. In the above embodiment, since the amorphous material employed is of metal metalloid series (75% of Fe, Co series, 25% of semi-metals such as Si, B, P and C), with Curie temperature Tc at 450° and crystallization temperature Tx at approximately 500° C., the temperature is raised to the vicinity of a point below Curie temperature Tc and the heat treatment is effected in the magnetic field (especially, rotating magnetic field).

Figure 8:
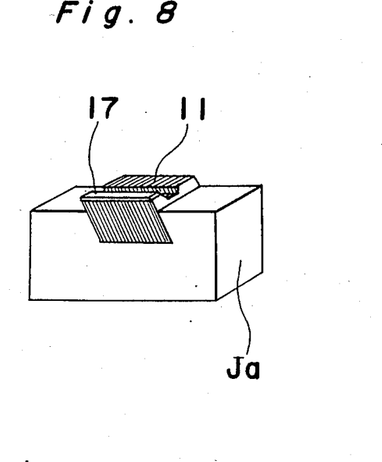
FIG. 8 is a view similar to FIGS. 7(a) and 7(b), which particularly shows provision of a spacer.

Subsequently, as shown in FIG. 8, the large number of core chips 11 are again laminated within the jig Ja, and a spacer 17 of non-magnetic material such as $SiO_2$, TiN, SiN, WN or the like is formed on the surface equivalent to the head gap by a predetermined gap length (for example, 0.4 to 0.05 micron) through vapor deposition or ion plating. It may be so arranged that the predetermined gap length is covered through combination with other core halves.

Figure 9:
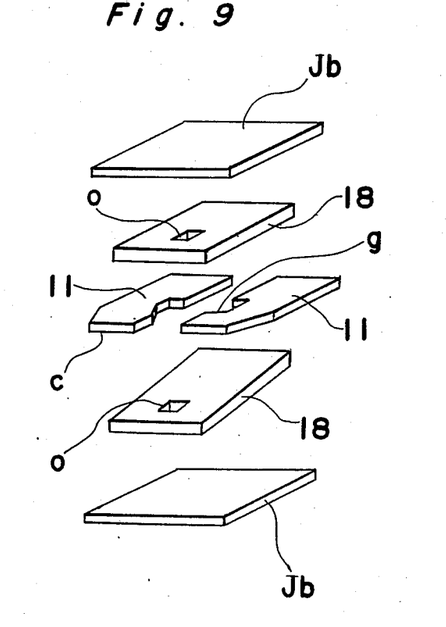
FIG. 9 is an exploded perspective view of the magnetic head of FIG. 1 before assembly.
Figure 10:
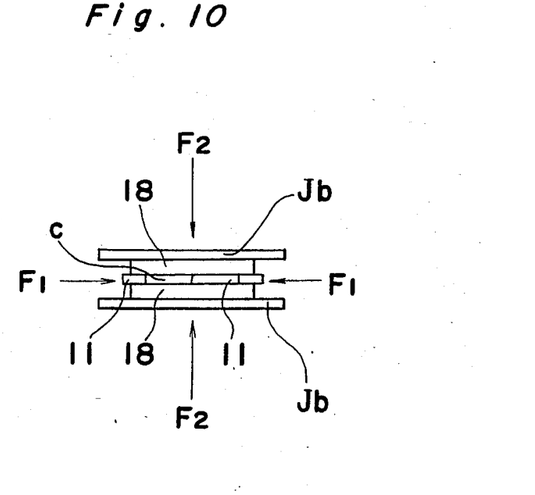
FIG. 10 is a side elevational view of the magnetic head of FIG. 9 as assembled.

Thereafter, as shown in FIG. 9, a set of core halves 11 and separately prepared reinforcing members 18 of glass material are disposed between sheets Jb, for example, of Teflon as a jig, and the core halves 11 are depressed from opposite sides by forces F1 of 10 to 100 grams as shown in FIG. 10, while the whole structure is vertically depressed by forces F2 through the sheets Jb. For facilitation of depression of the core halves 11 as described above, for example, by a jig Jc (FIG. 11), each of the core halves 11 is arranged to laterally project from the reinforcing member 18 to a certain extent.

Figure 11:
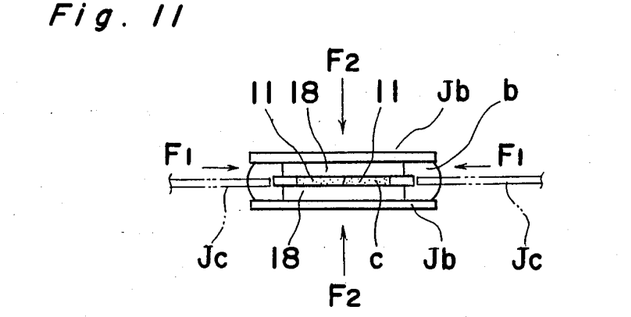
FIG. 11 is a view similar to FIG. 10 explanatory of combination of respective elements into one unit by a resinous material.
Figures 12A, 12B:
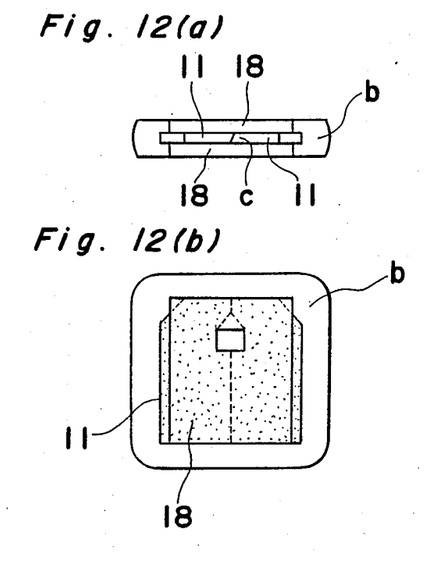
FIGS. 12(a) and 12(b) are a top plan view and a front elevational view of the magnetic head as released from a jig.

With the depressed state as described above maintained, the whole structure of the magnetic head is impregnated with epoxy resin in the vacuum state, with a subsequent hardening or curing through heating (by leaving to stand at a temperature of 100° C. for 60 to 90 minutes), and thus, the reinforcing members 18 and core halves 11 are combined into one unit together with the depressing jig Jc between the sheets Jb as shown in FIG. 11. After curing of the epoxy resin, the structure thus combined is released from the sheets Jb and jig Jc (FIGS. 12(a) and 12(b)) and is properly shaped for its tape contacting face or the like with further provision of coils, etc., and thus, the magnetic head as shown in FIG. 1 is obtained.

The material for the sheets Jb is not limited to ethylene tetrafluoride or trifluoride (e.g. Teflon) as described above, but may be replaced by any material such as polyethylene, polypropylene or the like so far as it can be utilized as a solid releasing material to which epoxy resin does not adhere. However, releasing material in a liquid form is not suitable for the purpose, since it tends to penetrate into gap portions of the head or between the reinforcing members and cores for undesirable reduction of the bonding strength therebetween.

Moreover, it is preferable that the reinforcing members 18 are constituted by a dense material of a non-magnetic and non-conductive nature such as ceramics, etc. besides glass as described earlier, because a sintered material having air bubbles or voids therein tend to be subjected to clogging by the magnetic particles from the magnetic tape, thus resulting in an increased spacing loss. Forming the reinforcing members 18 by a metallic material is not preferable, since recording efficiency is extremely reduced by an anti-magnetic field produced in the metallic reinforcing members during the recording, but is suitable for a magnetic head exclusive for reproduction, because such metallic reinforcing members function to improve reproducing efficiency during the reproduction.

Figure 13:
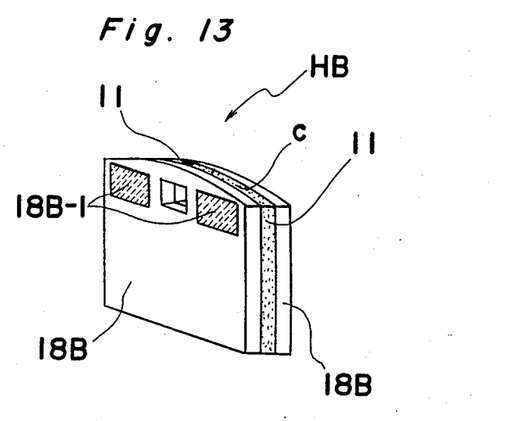
FIGS. 13, 14(a) and 14(b) are perspective views of magnetic heads according to modifications of the present invention.
Figure 14A:
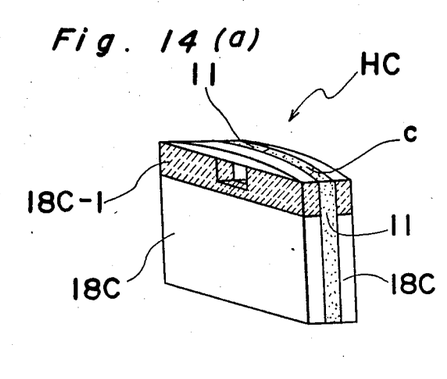
Figure 14B:
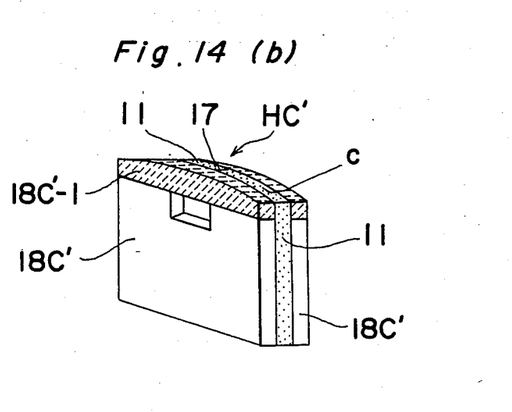

Referring to FIGS. 13 and 14(b), there are shown modifications of the magnetic head HA as described so far. In the modified magnetic head HB of FIG. 13, the reinforcing members 18B made of a metallic material has coil winding portions 18B-1 of non-metallic material as indicated by hatchings, while in the modified magnetic head HC of FIG. 14(a), the reinforcing members 18C made of a metallic material also have coil winding portions 18C-1 of non-metallic material as shown by hatchings. The magnetic heads Hb, and HC of the above described type may be used as heads both for recording and reproduction. In another modified magnetic head HC' in FIG. 14(b), the reinforcing members 18C' are made of a magnetic ferrite material, while the portion 18C'-1, at least corresponding to the spacer 17 should be made of a non-magnetic material, for example, glass in order to prevent magnetic shortcircuiting. In connection with the above, it is to be noted that, in a laboratory experiment, required reproduction output of the magnetic head may be obtained even when the reinforcing members are entirely made of a glass material, but considerable care and attention are required for the processings. When the reinforcing members are constructed in the manner as described above with reference to FIGS. 13, 14(a) or 14(b), the reproduction output of the magnetic head can be readily improved. Since other constructions and effects of magnetic heads HB, HC and HC' are generally similar to those of the magnetic head HA of FIG. 1, detailed description thereof is abbreviated for brevity.

As is clear from the foregoing description, according to the present invention, it is so arranged that core halves formed into the predetermined shape from the amorphous magnetic thin material manufactured by the liquid melt rapid cooling method, without fundamentally effecting the processing in the direction of thickness of said amorphous material, are abutted against each other, while the reinforcing members are further applied to the core halves from opposite sides thereof, with resing being filled therebetween to be hardened for integration of the magnetic head structure, and therefore, magnetic heads for high frequency range having the main cores of amorphous magnetic material superior in magnetic characteristics may be manufactured at a favorable yield in production.

Figure 15:
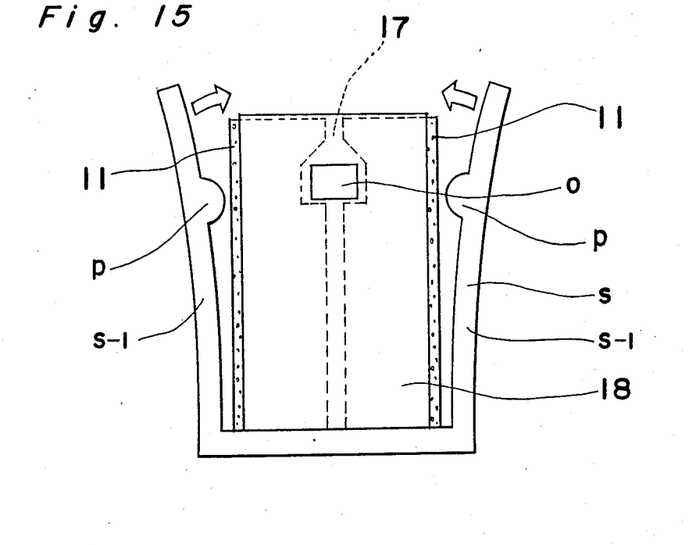
FIGS. 15 and 16 are a side elevational view and a perspective view for explaining a modified method of manufacturing an amorphous magnetic head according to the present invention.
Figure 16:
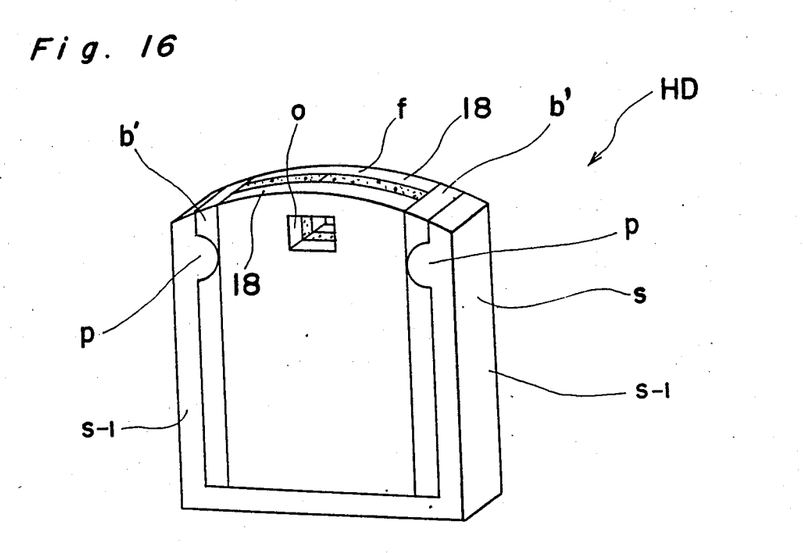

Referring further to FIGS. 15 and 16, there is shown a modified method of manufacturing an amorphous magnetic head. In this modification, the jigs Jb and Jc, etc. described as employed for keeping the core halves 11 in pressure contact with each other together with the reinforcing members 18 for the formation of the head gap in the foregoing embodiments are replaced by a resilient spring frame S made, for example, of non-magnetic metal or resinous material, and formed by chemical etching or blanking through processing by a machine to have a size just sufficient to accommodate therein an assembly of the core halves 11 and reinforcing members 18.

More specifically, as shown in FIG. 15, the resilient spring frame S is provided with side portions S-1 having projections p for depressing the core halves 11. With said side portions S-1 slightly opened outwardly at upper ends thereof, and the frame S is fitted around the assembly including the core halves 11 abutted against each other through the non-magnetic spacer 17 and held between the reinforcing members 18 as described previously, with the bonding material b' being applied between the side edges of said assembly and the inner edges of the frame S, whereby the core halves 11 are pressed against each other at the projections p by the spring force of the side portions S-1 in the directions shown by arrows to provide the amorphous magnetic head HD as shown in FIG. 16.

After completion of the assembling of the magnetic head, the frame S may be removed from the magnetic head or left as it is on the magnetic head depending on neacessity.

By the above modified method, the jigs required for the manufacture of the amorphous magnetic heads may be dispensed with for the simplification of the manufacturing process.

Figure 17:
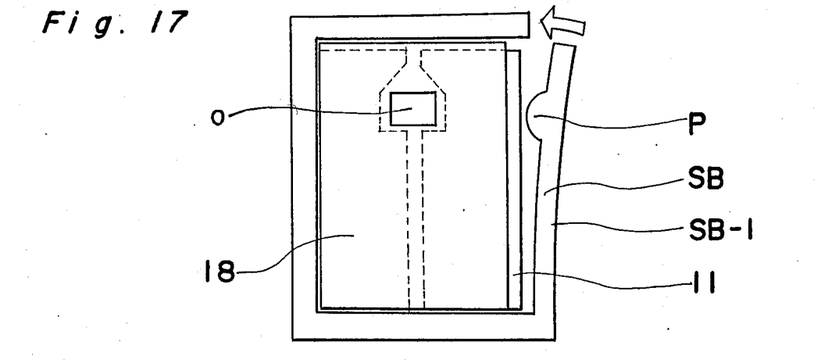
FIG. 17 is a side elevational view similar to FIG. 15 for explaining another modified method of manufacturing an amorphous magnetic head of the present invention.

In another modified method as shown in FIG. 17, the frame SB made, for example, of a metallic material having a resiliency such as phosphor bronze, stainless steel, etc. has its one side portion SB-1 cut off at one end and provided with a projection p so as to act as a spring for effecting abutting of the core halves 11 (i.e. formation of the head gap) by the resilient restoring force of said side portion SB-1. In this case also, the frame SB may be removed or left as it is after completion of the magnetic head, but if the frame SB is to be left on the magnetic head as in the arrangement of FIG. 16, non-magnetic material should be used for the frame SB.

Figure 18:
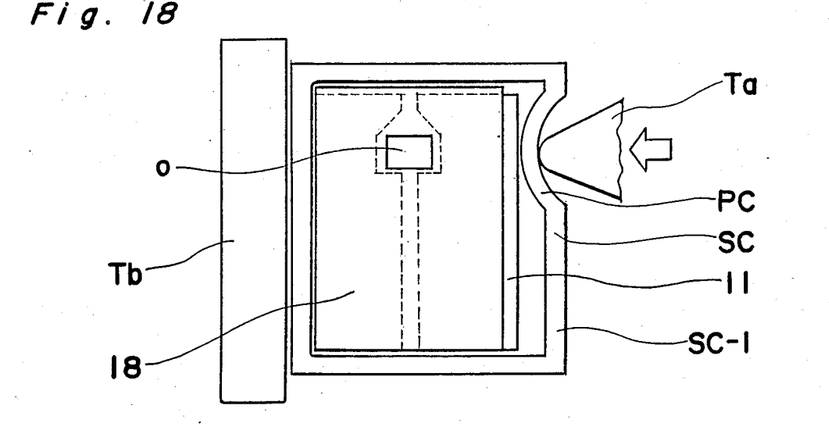
FIGS. 18 and 19 are a side elevational view and a perspective view similar to FIGS. 15 and 16 for explaining still another modified method of manufacturing an amorphous magnetic head according to the present invention.
Figure 19:
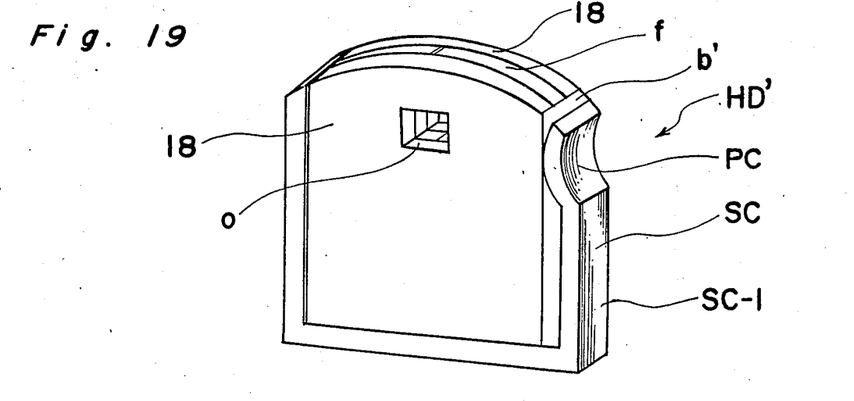

In still another modified method as illustrated in FIGS. 18 and 19, the frame SC with a continuous side portions has a protrusion pc formed in one side portion SC-1 thereof as shown. For use, the frame SC is fitted around the assembly including the core halves 11 and the reinforcing members 18, and the protrusion pc is pushed inwardly in a direction indicated by an arrow in FIG. 18 by a depressing plate Ta, with the frame SC being supported at the other side by a support plate Tb for abutting the core halves 11 against each other by depressing one of the core halves 11 at the protrusion pc so as to form the head gap. After impregnation of the bonding material b' and subsequent curing in the manner as described earlier, the magnetic head thus assembled is subjected to formation of the predetermined radius of curvature at the tape contact surface f and depth adjustment to provide a finished magnetic head HD' as shown in FIG. 19. For the convenience in the coil winding, the frame should preferably be of non-magnetic material, but in the case where the frame is to be detached from the magnetic head after impregnation of the bonding material b and subsequent curing thereof, the frame need not necessarily be of non-magnetic material.

By the employment of the frames according to the present invention as described so far with reference to FIGS. 15 to 19, positioning of the amorphous core halves and reinforcing members during assembly of the magnetic head has been facilitated, and furthermore, by preventing core halves from rotation during abutting thereof, it becomes possible to stably obtain favorable head gaps, with a consequent improvement of the yield in the abutting step in the manufacture of the magnetic heads.

Figure 20:
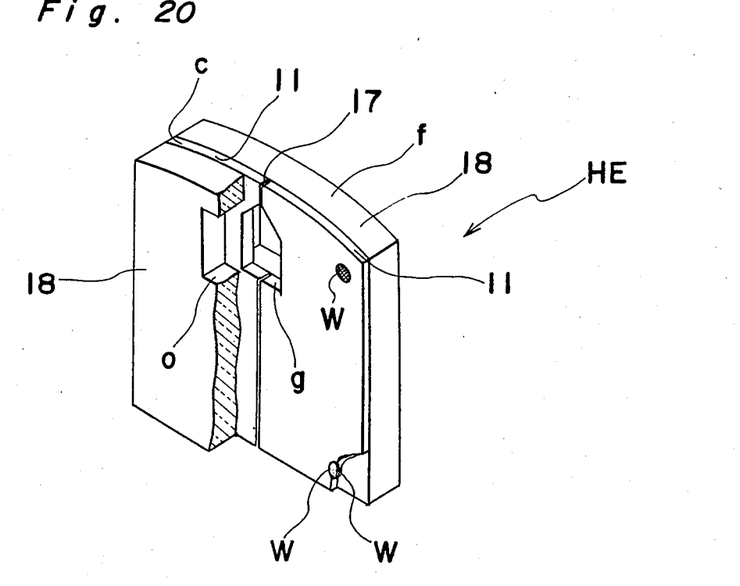
FIGS. 20 and 21 are a perspective view and a side elevational view of an amorphous magnetic head according to another modification of the present invention.
Figure 21:
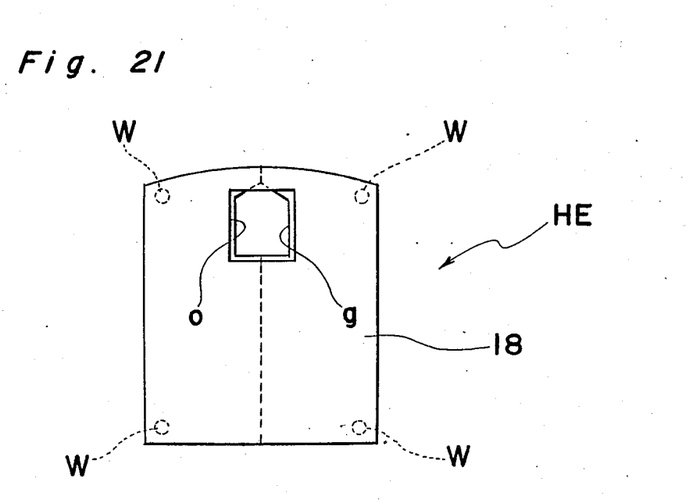
Figure 22:
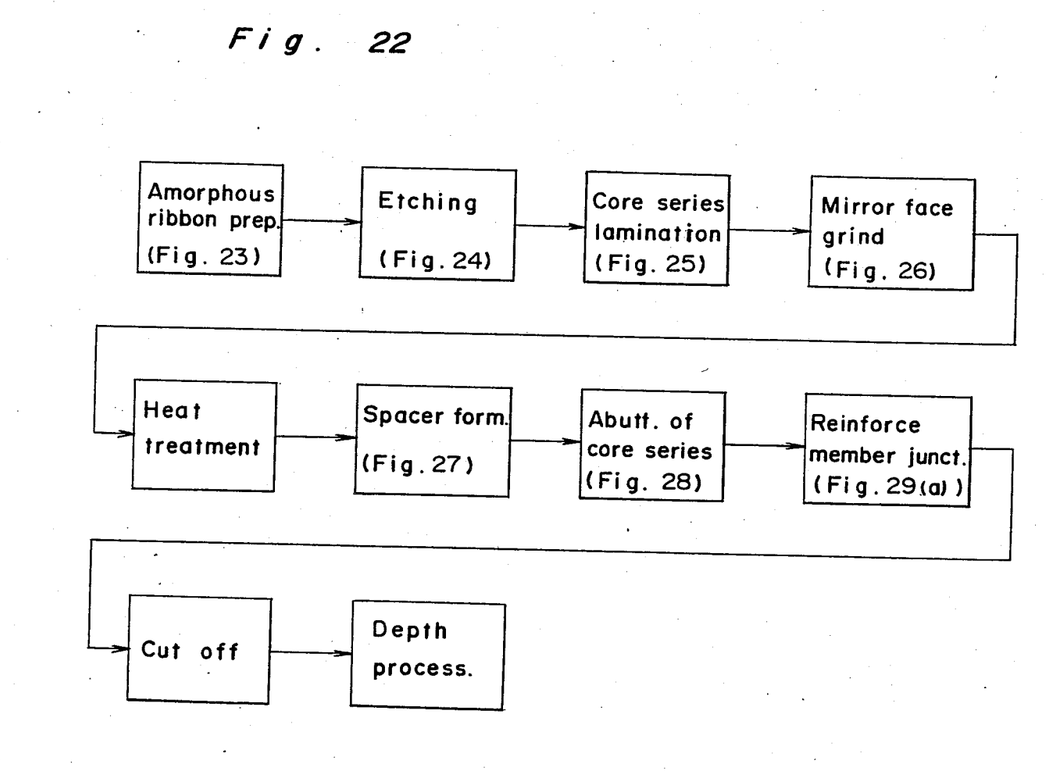
FIG. 22 is a flow-chart for explaining a manufacturing method of an amorphous magnetic head according to a further modification of the present invention.
Figure 23:
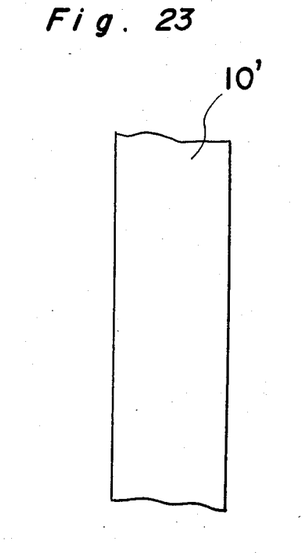
FIG. 23 is a fragmentary top plan view of an amorphous ribbon to be employed in the modified manufacturing method of FIG. 22.
Figure 24:
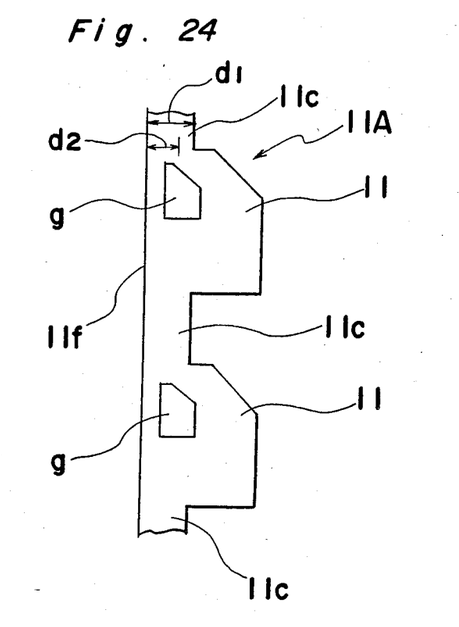
FIG. 24 is a fragmentery top plan view of the amorphous ribbon of FIG. 23 after etching.

In FIGS. 20 and 21, there is shown another modification of the amorphous magnetic head of FIG. 1.

In the modified amorphous magnetic head HE of FIGS. 20 and 21, the core halves 11 abutted against each other through the non-magnetic spacer 17 and held between the reinforcing members 18 are formed into one unit with said reinforcing members 18 by partially fusing the core halves 11, instead of employing the resinous material b for integration as in the magnetic head HA of FIG. 1.

More specifically, as shown in FIGS. 20 and 21, the magnetic head HE includes, for example, welded portions w disposed at corresponding four corners thereof. These welded portions w may be formed by directing laser beams from laser beam sources (not particularly shown) onto the assembly which includes the core halves 11 abutted against each other through the non-magnetic spacer 17 so as to be held between the reinforcing members 18, and which is depressed both in the vertical and lateral directions as described earlier. In other words, the laser beams pass through the reinforcing members 20 of transparent glass material so as to be converted into heat on the surface of the core halves 11 made of the amorphous magnetic material for fusing corresponding portions thereof. Thereafter, upon interruption of the laser beam irradiation, the core halves 11 and the reinforcing members 18 contacting said core halves 11 are welded together during solidification of the molten material. By effecting the operations as described above successively or simultaneously at the respective corner portions on the opposite faces of the main core c having the core halves 11, the integration of the main core c with the reinforcing members 18 is completed. The size or diameter of each of the welded portions w may be set approximately in the range of 1 to 2 microns.

Referring further to FIGS. 22 to 29(b), still another modification of the method of manufacturing the amorphous magnetic head according to the present invention, which is particularly suited to mass production, will be explained hereinbelow.

Firstly, the ribbon 10' of the amorphous material approximately 24 microns or so in thickness is prepared by the liquid melt rapid cooling method in the similar manner as described earlier (FIG. 23), and a first series 11A of core halves 11 of a required shape are formed in the above ribbon 10' by the chemical etching (FIG. 24), with the through-opening for the groove g being formed in each of the core halves 11 for winding the coil therethrough. The first series 11A of core halves 11 thus prepared is shown in the state before the surface 11f thereof corresponding to a second series 11B of core halves 11 to be discribed later is formed through cutting, and includes the plurality of core halves 11 and connecting portions 11c which are alternately provided, with a width d1 of each connecting portion 11c being arranged to be sufficiently larger than a width d2 which is to be cut off during formation of the surface 11f.

Figure 25:
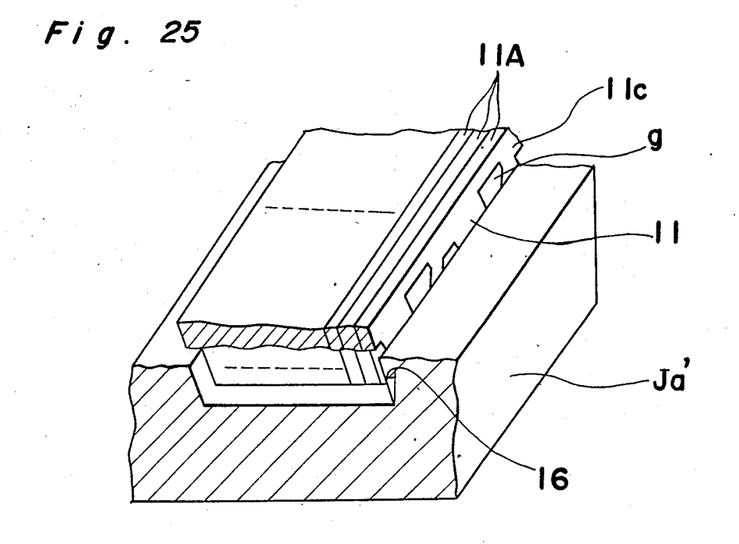
FIGS. 25 and 26 are fragmentary perspective views of a number of series of core halves as accommodated in a jig for explaining grinding process of confronting surfaces of the core halves.
Figure 26:
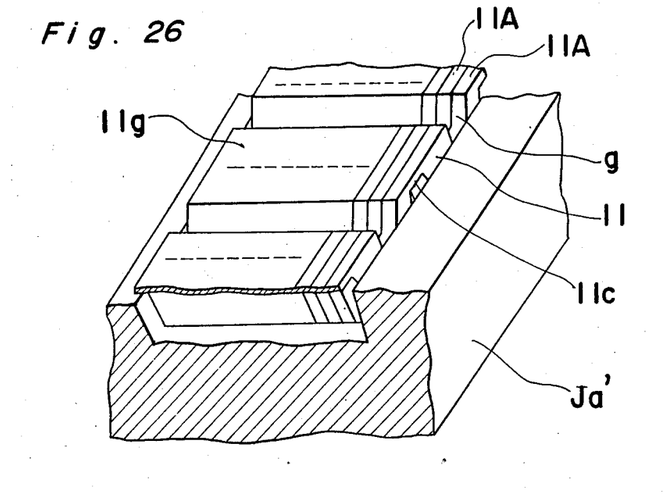

As shown in FIG. 25, many first series 11A of core halves 11 as described above are laminated in the direction of thickness so as to be accommodated in the jig Ja' and are first subjected to rough grinding so as to remove sagging and the like due to the etching for setting the core halves 11 into the predetermined dimensions. Subsequently, the head gap forming face 11g thereof is ground through employment of very fine grinding grains and a grinding machine. It is to be noted that the accommodating angle 16 of the first series 11A of core halves 11 with respect to the wall face of the jig Ja' is adapted to coincide with the azimuth angle in the similar manner as described earlier with reference to FIG. 6(b). FIG. 26 shows the state upon termination of the grinding.

Each of the series 11A of core halves 11 ground as described above is detached from the jig Ja' for the heat treatment in the manner as described earlier with reference to the first embodiment of FIGS. 1 to 12(b).

Figure 27:
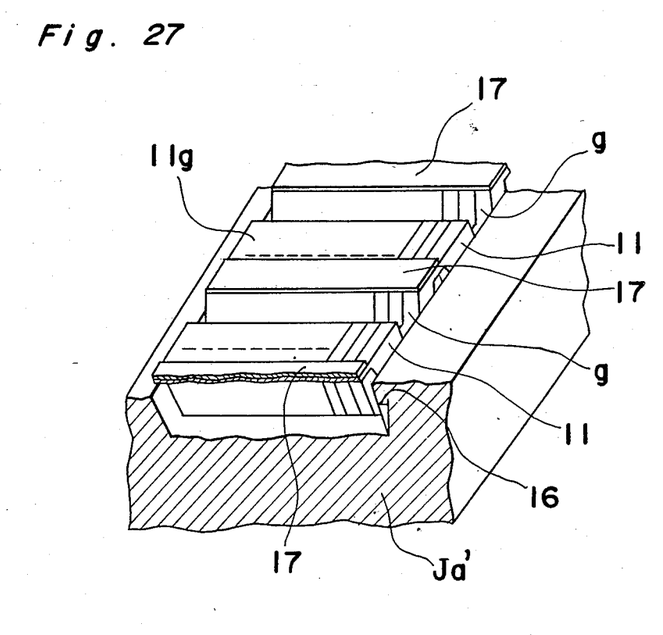
FIG. 27 is a view similar to FIG. 26, which particularly shows the process for providing spacers.

Subsequently, as shown in FIG. 27, the large number of the series of core halves 11 are again laminated within the jig Ja', and the spacers 17 of non-magnetic material such as $SiO_2$, TiN, SiN, WN or the like are formed on the surface 11g equivalent to the head gap by a predetermined gap length (for example, 0.4 to 0.05 micron) through vapor deposition or ion plating. It may be so arranged that the predetermined gap length is covered through combination with other core halves in the similar manner as in the previous embodiment.

Figure 28:
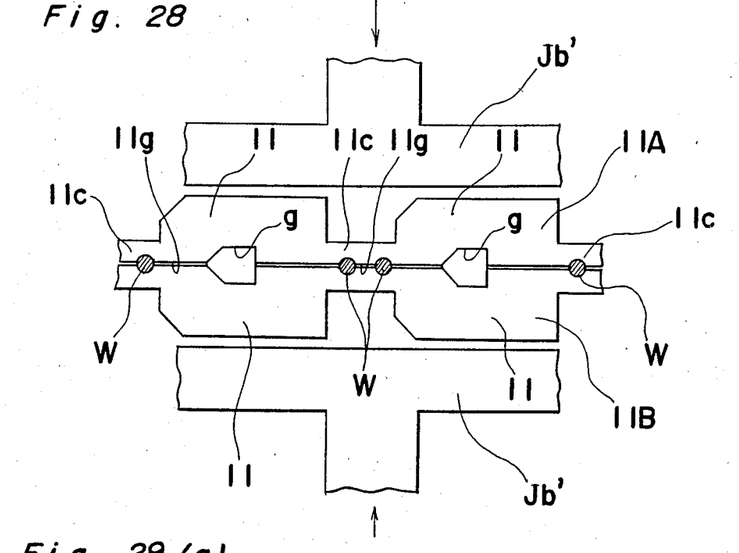
FIG. 28 is a fragmentary top plan view for explaining a temporary fixing process of first and second series of core halves.

Thereafter, as shown in FIG. 28, the first series 11A and the second series 11B of core halves 11 are disposed so that the head gap forming surfaces 11g and the coil winding openings g of the respective series 11A and 11B coincide with each other, and abutted against each other through depression by the jig Jb'. In the above state, laser beams are irradiated onto both of the series 11A and 11B of core halves 11 so as to bridge the respective connecting portions 11c by welding therebetween to effect temporary connection as indicated at the spots w.

Figure 29A:
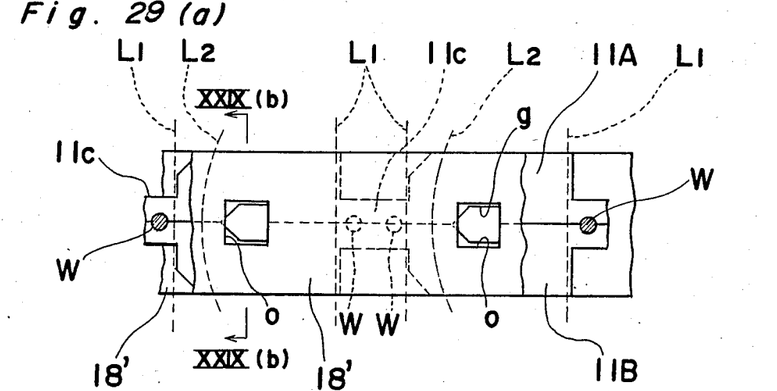
FIG. 29(a) is a fragmentary top plan view for explaining a joining process of reinforcing members and cores.
Figure 29B:
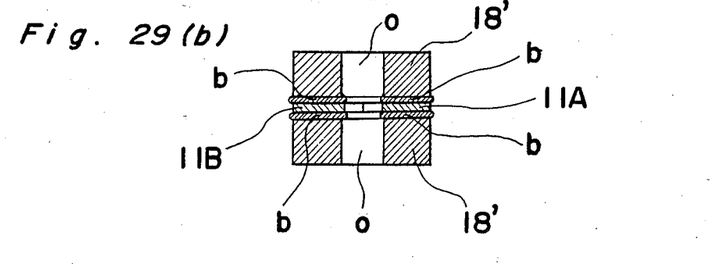
FIG. 29(b) is a side sectional view taken along the line XXIX(b)—XXIX(b) in FIG. 29(a).

In the next step, as shown in FIGS. 29(a) and 29(b), the series 11A and 11B of the core halves 11 temporarily combined with each other as described above are held between the reinforcing members 18' having the through-openings o corresponding to the coil winding openings g so that the openings o confront the openings g, and epoxy resin is impregnated between the series 11A and 11B of the core halves 11 and the respective reinforcing members 18' in the vacuum state for heat curing by being left to stand for 60 to 90 minutes at 100° C. In FIG. 29(b), the layers of epoxy resin or bonding material thus formed are represented by "b".

In the manner as described above, the respective series 11A and 11B of the core halves 11 are bonded to the reinforcing members 18' for integration therewith.

Subsequently, as shown by dotted lines L1 in FIG. 29(a), the assembly thus obtained is cut off into individual chips of magnetic heads, whose contact surfaces with respect to the magnetic tape are ground for a proper radius of curvature matched with the magnetic tape as indicated by dotted lines L2 so as to provide a required gap depth.

By the method as described so far, the amorphous magnetic head, for example, as shown in FIG. 1 may be manufactured in an efficient manner on a large scale.

In the above manufacturing method of FIGS. 22 to 29(b), since it is so arranged that one set of the series of core halves are temporarily connected to each other by welding the connecting portions for connecting the plurality of core halves so as to be bonded to the reinforcing members in such a state, the depression in the direction to push the core halves to each other is not required during the bonding, with the depression only from the side of the reinforcing members, i.e. in the vertical two directions sufficiently serving the purpose, thus resulting in a facilitation of bonding work and consequently, in an improved efficiency for the mass production of the magnetic head.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. An amorphous magnetic head, comprising:
    a main core including a pair of abutted core halves of similar shape, each formed of a non-laminated thin sheet of amorphous magnetic material and having a coil winding opening;
    a non-magnetic spacer forming a head gap and being disposed in the abutted portion of said core halves ranging from a front edge of said main core to said coil winding opening;
    a set of reinforcing cores fixed to opposite sides of said main core to hold said core halves therebetween, wherein each of said reinforcing cores is made of a laser beam transmitting glass material, each of said reinforcing cores has a coil winding opening generally corresponding to the coil winding opening in said main core, and each of said reinforcing cores has a continuous construction, such that there are no junctions therein; and
    a combining means for combining said reinforcing cores and said core halves into one unit, wherein said combining means includes means for partially fusing said core halves at predetermined welding spots so as to be bonded to said reinforcing cores thereat, and wherein said amorphous magnetic head is several millimeters in length and width and several hundred microns in thickness.

2. An amorphous magnetic head as claimed in claim 1, wherein said partially fusing means includes laser beams for effecting spot welding at said predetermined welding spots.

3. An amorphous magnetic head as claimed in claim 1, wherein said predetermined welding spots are provided one at each of four corners of the amorphous magnetic head.

* * * * *